United States Patent [19]

Crossman

[11] 4,159,843
[45] Jul. 3, 1979

[54] PICKUP TRUCK AIR DEFLECTOR

[76] Inventor: Milton R. Crossman, 8212 Ethel Ave., North Hollywood, Calif. 91605

[21] Appl. No.: 837,605

[22] Filed: Sep. 28, 1977

[51] Int. Cl.² .............................................. B62D 37/00
[52] U.S. Cl. ...................................... 296/1 S; 296/91
[58] Field of Search .................................. 296/1 S, 91

[56] References Cited

U.S. PATENT DOCUMENTS

| 2,963,315 | 12/1960 | Wilsdorf | 296/91 |
| 3,276,811 | 10/1966 | Schmidt | 296/1 S |
| 3,514,023 | 5/1970 | Russel | 296/1 S |

FOREIGN PATENT DOCUMENTS 2535645  2/1977  Fed. Rep. of Germany ........... 296/1 S Primary Examiner—Philip Goodman
Attorney, Agent, or Firm—George J. Netter

[57] ABSTRACT

A pair of deflector segments are telescopingly interconnected to provide an air deflector of adjustable length. Each deflector segment includes a sloping forwardly facing portion, a relatively flat top, a vertical rear wall, and closed outer ends. The combined segments are fittingly received onto the top rear edge portion of the truck car and, after adjustment to accommodate the cab width, they are fixedly secured to the cab surface.

3 Claims, 4 Drawing Figures

PICKUP TRUCK AIR DEFLECTOR

BACKGROUND OF THE INVENTION

The present invention relates to a wind deflector on the cab roof of a pickup truck or the like to move the airstream upwardly away from the truck bed, thereby enhancing efficiency of operation.

In trucks having open beds, a continuing problem encountered during use is the tendency for the airstream to whip downwardly into the truck bed and blow out, or at least disturb the contents. In addition, the airstream bearing against the truck bed bottom and the inside surface of the closed tailgate acts as a retarding force on the truck which is reflected adversely in lowered gasoline mileage, among other things. Frequently, as an attempt to alleviate the condition, the truck is driven with the tailgate down, allowing the airstream to pass through the truck bed without producing significant retarding forces.

SUMMARY OF THE INVENTION

The deflector of this invention comprises a pair of deflector segments which are telescopingly interconnected to provide an adjustable length. Each deflector segment includes a sloping forwardly facing portion, a flat top, a substantially vertical rear wall, and closed outer ends. The two segments are fittingly received onto the top rear edge portion of the truck cab and, after being telescopingly adjusted to accommodate the cab width, are fixedly secured to the cab surface.

DESCRIPTION OF A PREFERRED EMBODIMENT

Figure 1:
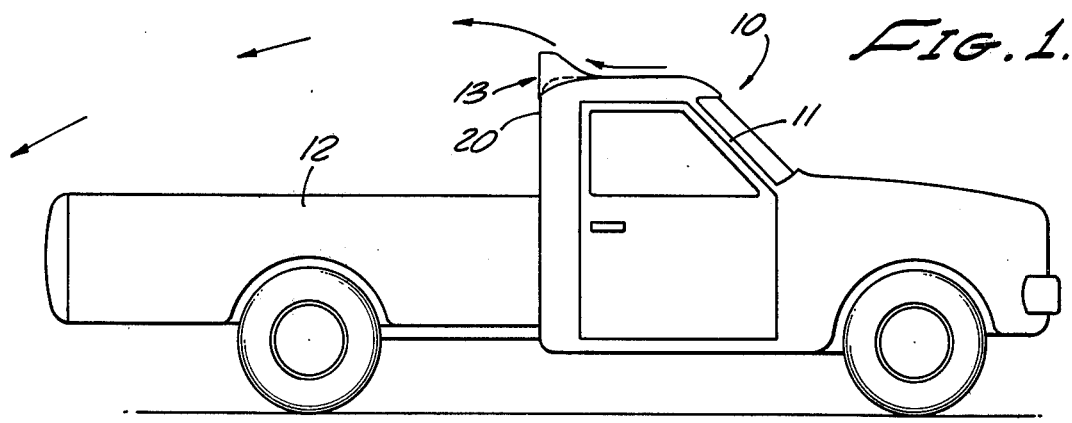
FIG. 1 is a side elevational view of a pickup truck with the air deflector of this invention installed thereon.

With reference now to the drawing and particularly to FIG. 1, there is shown a pickup truck 10 including a cab 11 and open bed 12, the latter forming an open-top compartment for carrying items of all kinds. The deflector 13 of this invention is mounted on the roof of the cab 11 and has for its primary function that of intercepting the airstream while the truck is moving and deflecting it upwardly and along the path indicated by the arrows. More particularly, the deflector moves the airstream a sufficient amount so that it will not blow into the truck bed against the tailgate producing a retarding force that would reduce efficiency of truck operation.

Figure 2:
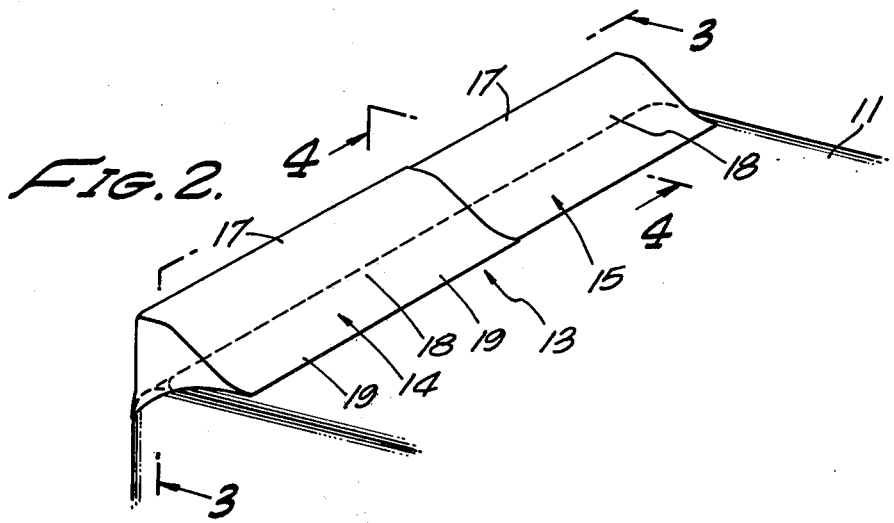
FIG. 2 is an enlarged perspective view of the air deflector.
Figure 3:
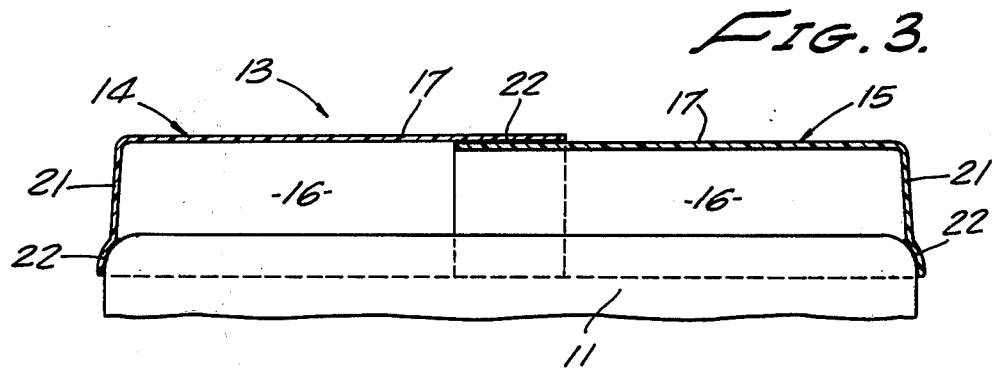
FIG. 3 is a sectional, front elevational view of the air deflector taken along the line 3—3 of FIG. 2.
Figure 4:
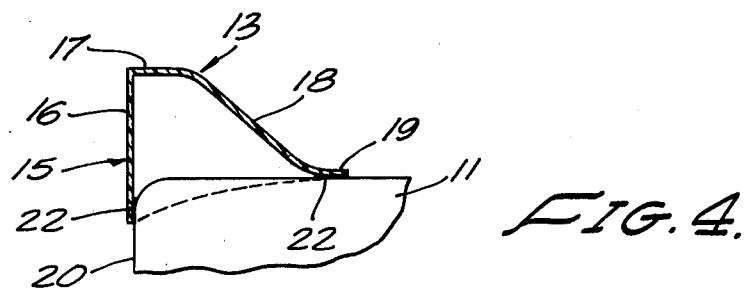
FIG. 4 is a sectional, end elevational view taken along the line 4—4.

Turning simultaneously to FIGS. 2–4, the deflector 13 is seen to comprise two elongated, hollow segments 14 and 15 having open ends that are telescoped together. Each segment includes a vertically extending back wall 16 terminating at its lowermost part in an edge, and is integrally related at its top part with a horizontal, flat, forwardly extending portion 17. From 17 a downwardly sloping wall 18 extends forwardly with its forwardmost edge turning slightly upwardly, as at 19. When in place on the cab roof, the lower edge of the back wall 16 extends substantially down the rear cab wall 20 and the forward edge 19 of the sloping wall 18 fits snugly against the cab roof.

As seen best in FIG. 3, the outer end of each segment is enclosed by an end wall 21, the lower edge of which flares outwardly a slight amount for fitting receipt onto the upper side walls of the cab closely adjacent the cab top.

It is contemplated that the deflector segments are to be molded from a somewhat resilient material (e.g., fiberglass, plastic, sheet metal) which will deform sufficiently to form a close fitting relation with the cab top. Although other means may be used to secure the segments to the cab top, and to each other, it is preferable that a suitable cementitious material be used (e.g., epoxy) as at 22, for example.

I claim:

1. A wind deflector for securement to the cab of a truck having an open bed to deflect the airstream beyond the open truck bed, thereby eliminating a retarding force component from acting on the truck, said cab having a top, back wall and side walls, said deflector comprising:

a pair of elongated deflector segments, each segment having a back wall, a contoured top wall integral with said back wall, a sloping front wall, and an end wall, the other end and bottom being open;

said deflector segments being telescoped to one another at their open ends and located on the truck cab top to extend transversly of the cab, each segment back wall being fittingly received onto and intimately contacting the cab back wall, the sloping front wall extending downwardly from the contoured top wall to contact the cab along a continuous line, and the end wall smoothly contacting the side wall; and means securing the segments back wall, sloping front wall and end walls to the cab.

2. A wind deflector as in claim 1, in which the securing means includes an epoxy adhesive.

3. A wind deflector as in claim 1, in which the deflector segments are molded plastic.

* * * * *